United States Patent [19]

Hausfeld

[11] 4,085,582
[45] Apr. 25, 1978

[54] WALL AND NOZZLE ASSEMBLY FOR COLLOIDAL CORE REACTOR

[75] Inventor: Brian A. Hausfeld, Dayton, Ohio

[73] Assignee: The United States of America as represented by the Secretary of the Air Force, Washington, D.C.

[21] Appl. No.: 738,915

[22] Filed: Nov. 4, 1976

[51] Int. Cl.² .............................................. G21D 1/00
[52] U.S. Cl. ......................................... 60/203; 176/39
[58] Field of Search .................................. 176/39, 45; 60/202–203

[56] References Cited

U.S. PATENT DOCUMENTS

| | | | |
|---|---|---|---|
| 3,270,496 | 9/1966 | Rom | 176/39 X |
| 3,711,370 | 1/1973 | von Ohain et al. | 176/39 X |
| 3,713,970 | 1/1973 | von Ohain et al. | 176/39 X |
| 3,724,215 | 4/1973 | Neudecker | 60/203 |
| 3,730,832 | 5/1973 | Jackomis | 176/39 X |
| 3,730,834 | 5/1973 | Turman | 176/39 X |
| 3,768,253 | 10/1973 | Drawbaugh | 176/39 X |
| 3,817,029 | 6/1974 | Frisch | 176/39 X |
| 3,899,925 | 10/1975 | Hausfeld | 176/45 X |

Primary Examiner—Peter A. Nelson
Attorney, Agent, or Firm—Joseph E. Rusz; Richard J. Killoren

[57] ABSTRACT

A wall and exit nozzle assembly for a particle confined vortex system having a plurality of annular slots in the wall adjacent the exit throat nozzle. The wall and exit nozzle assembly includes a manifold ring, feeder channels to supply a gas flow through the annular slots. Swirl slots are provided in the assembly adjacent the annular slots to impart a rotational velocity to the gas flow. Additional gas ejection slots are provided adjacent the nozzle throat. Swirl slots are provided to supply a rotational velocity to the gas leaving the ejection slots in the nozzle throat.

1 Claim, 8 Drawing Figures

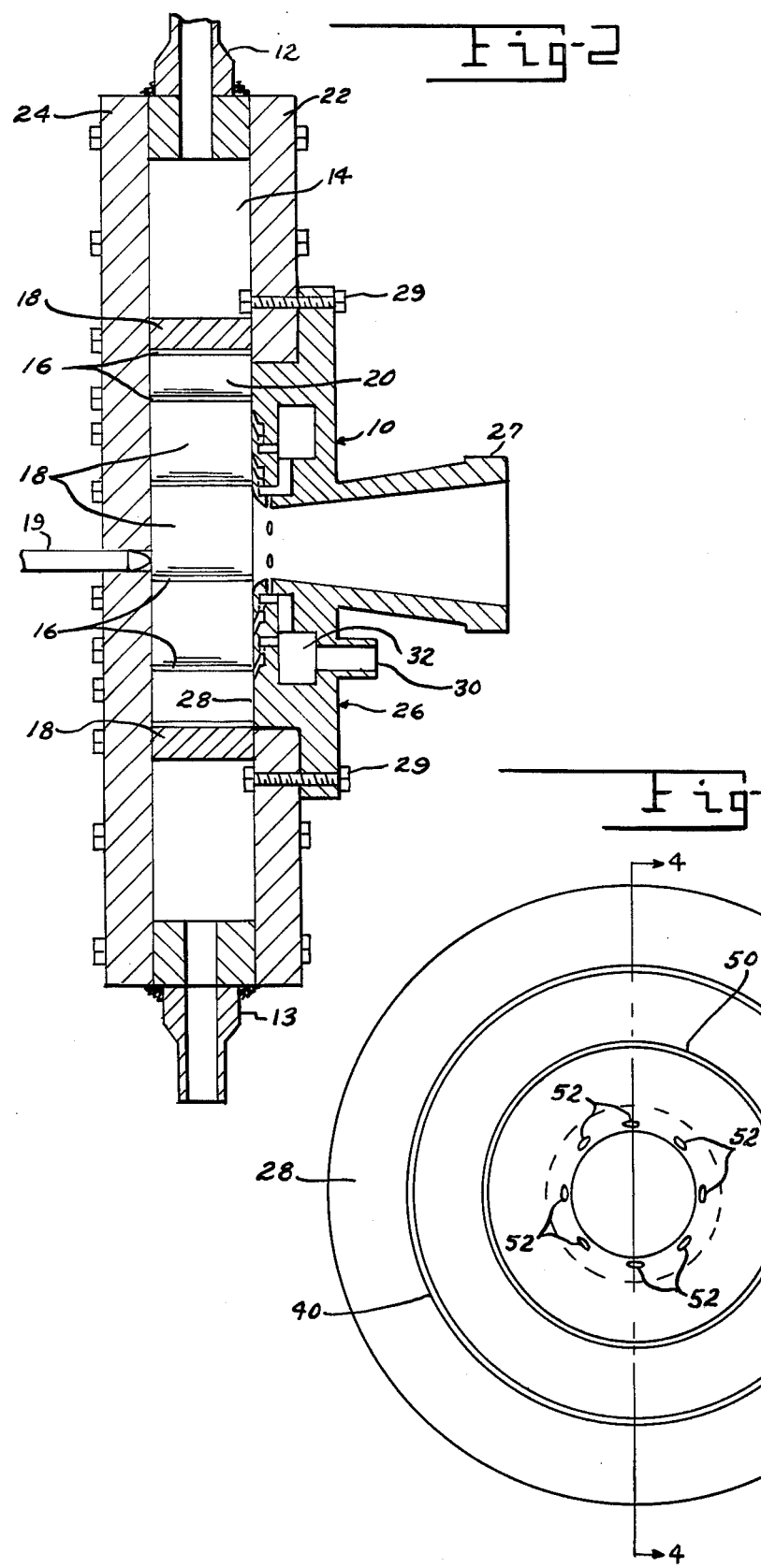

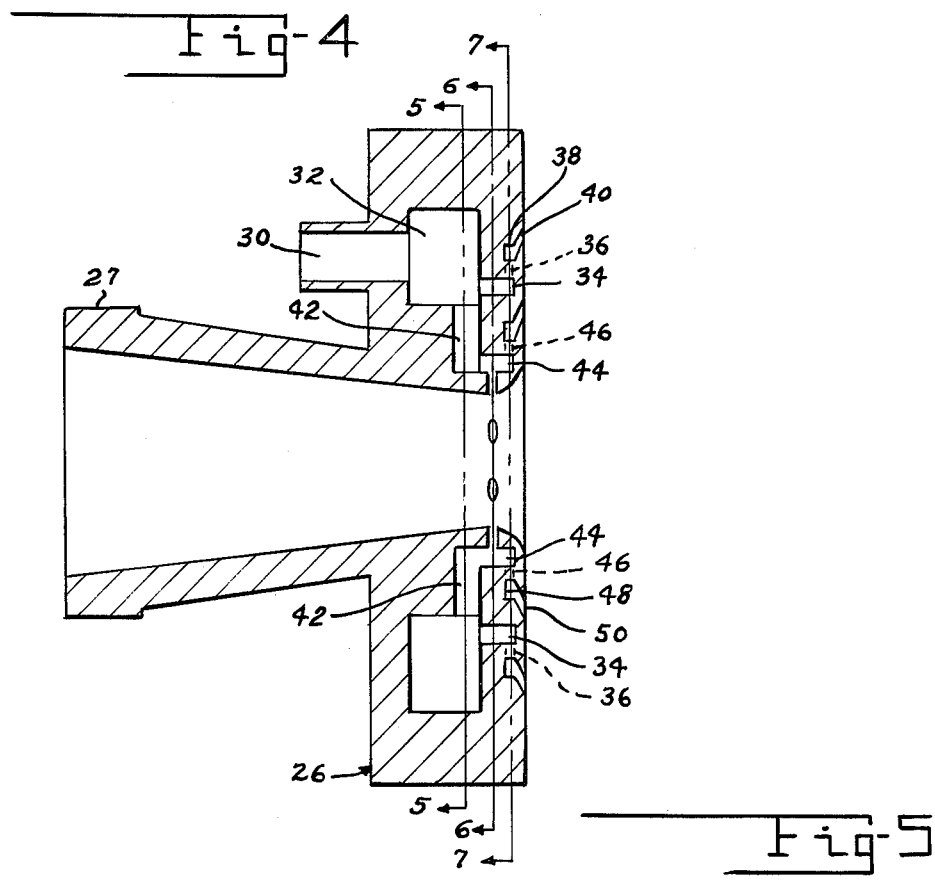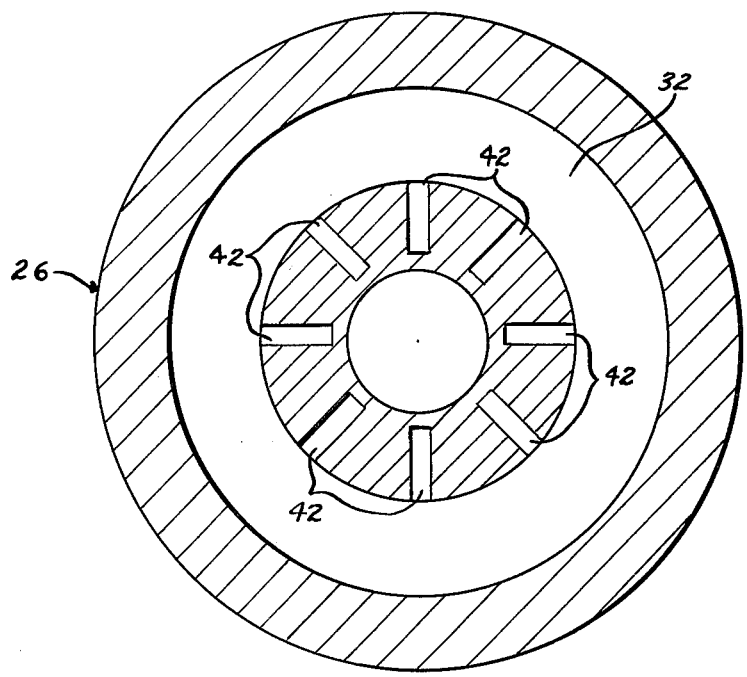

WALL AND NOZZLE ASSEMBLY FOR COLLOIDAL CORE REACTOR

RIGHTS OF THE GOVERNMENT

The invention described herein may be manufactured and used by or for the Government of the United States for all governmental purposes without the payment of any royalty.

BACKGROUND OF THE INVENTION

This invention relates to a wall and nozzle assembly for use in a multi-component flow system for confined particulate vortex system, such as in a small length to diameter ratio colloidal core nuclear reactors and developmental prototypes using the particulate-confined vortex mechanics.

Various systems have been provided for protecting the walls of colloidal core reactors from burnout. The U.S. Pat. to Rom, No. 3,270,496, discloses one such system. The U.S. Pat. to von Ohain et al, No. 3,711,370, discloses one small length to diameter ratio system which provides a boundary layer flow for protecting the walls and for reducing particle migration toward the nozzle.

The use of holes to provide a boundary flow to protect the walls and reduce particle migration results in an uneven flow along the wall.

BRIEF SUMMARY OF THE INVENTION

According to this invention, annular slots are provided in a wall and nozzle assembly of a small length to diameter ratio confined vortex system to supply a uniform boundary layer for wall protection. The boundary layer is directed radially outward from the axis of the system to further aid in reducing particulate migration toward the nozzle.

Also a plurality of gas flow nozzles are provided in the nozzle throat to provide protection for the nozzle throat wall and to centrifuge particles in the core of the vortex back into the critical section of the vortex system chamber.

IN THE DRAWINGS

FIG. 2 is a sectional view of the device of FIG. 1 along the lines 2—2.

FIG. 3 is an enlarged plan view of the inner surface of the wall and nozzle assembly of the device of FIGS. 1 and 2.

FIG. 4 is a sectional view of the device of FIG. 3 along the line 4—4.

FIG. 5 is a sectional view of the device of FIG. 3, taken along the line 5—5 of FIG. 4.

DETAILED DESCRIPTION OF THE INVENTION

Figure 1:
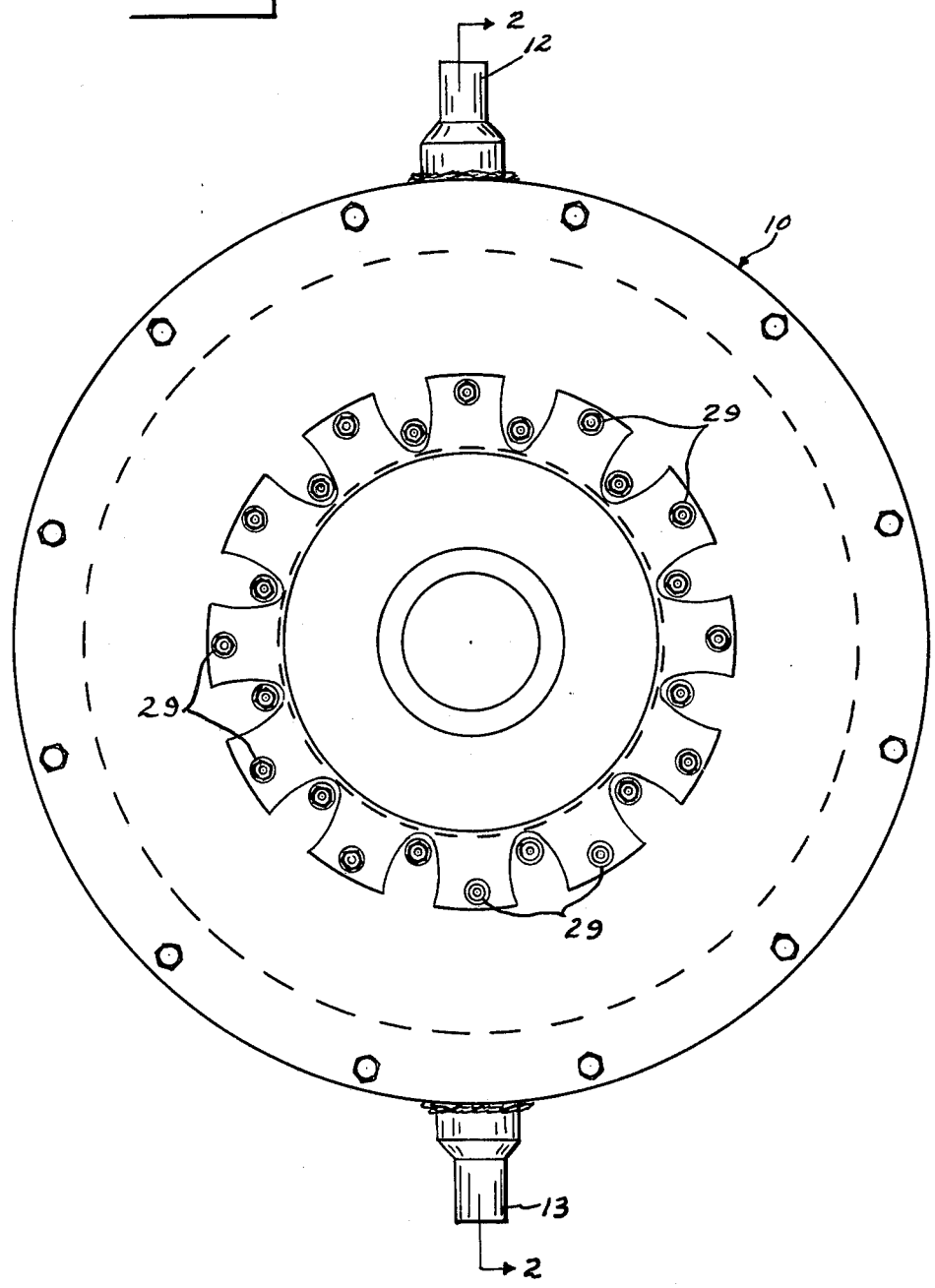
FIG. 1 shows a plan view of a colloidal core reactor with the device of the invention included.
Figure 6:
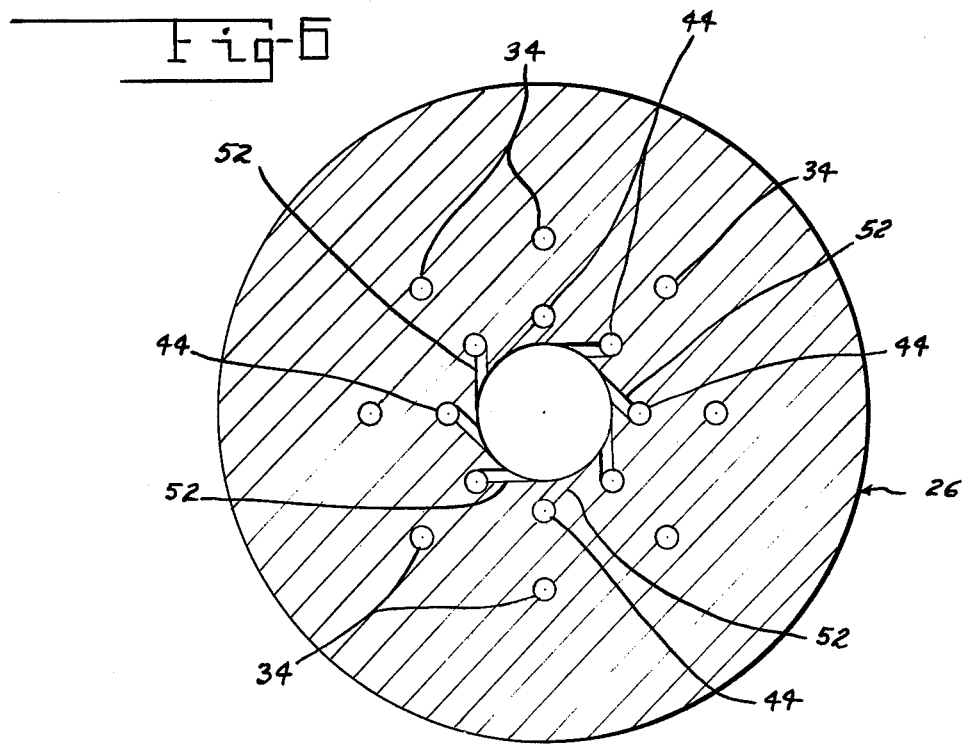
FIG. 6 is a sectional view of the device of FIG. 3, taken along the line 6—6 of FIG. 4.
Figure 7:
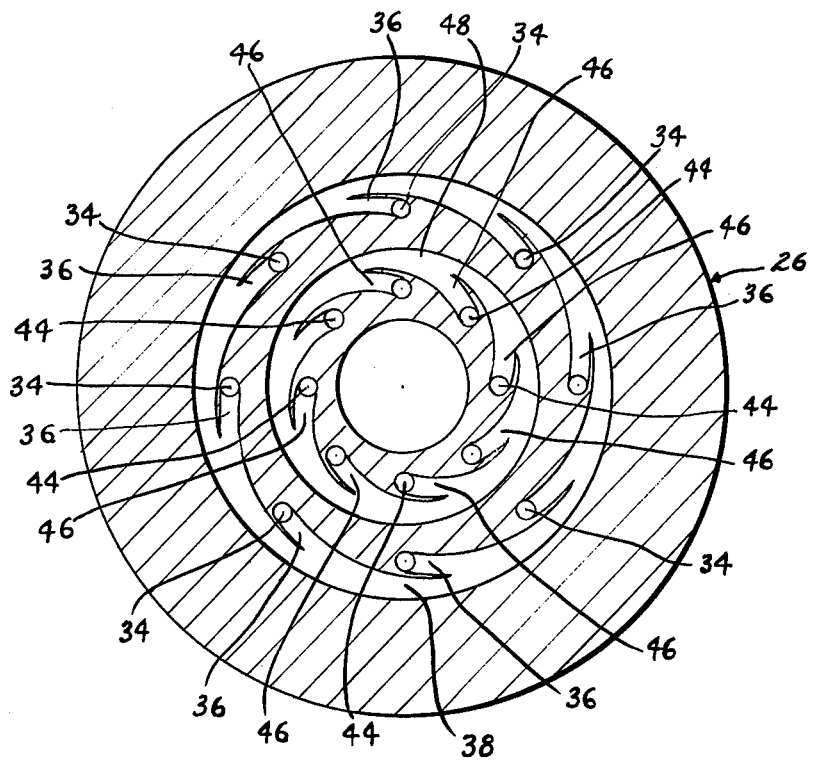
FIG. 7 is a sectional view of the device of FIG. 3, taken along the line 7—7 of FIG. 4.

Reference is now made to FIG. 1 of the drawing which shows a colloidal core reactor prototype 10 which has hydrogen or other light weight gas supplied to inputs 12 and 13 to a chamber 14. The low molecular weight gas flows from chamber 20 through slots 16 between vanes 18 to provide a vortex flow within chamber 20. Reactive material is supplied to the chamber 14 through a tube 19. In a prototype device, talcum powder was supplied to the chamber in a manner as described in my U.S. Pat. No. 3,899,925.

The wall and nozzle assembly 26 of the invention, including nozzle 27 and inner wall 28, is secured to the wall 22 by means of bolts 29. Assembly 26 forms one wall of chamber 20.

The assembly 26 has an inlet 30 for supplying the same light gas, as is supplied to inputs 12 and 13, to an annular manifold 32. As shown more clearly in FIG. 4, the gas from manifold 32 passes through feeder passages 34 to swirl slots 36 into an annular injection manifold 38 which equalizes the flow before it is injected into the chamber 20 through annular slot 40. Gas from manifold 32 also passes through feeder passages 42 and 44 to swirl slots 46 and into an annular injection manifold 48 which equalizes the flow before it is injected into chamber 20 through annular slot 50. Gas from feeder passage 44 is also supplied through swirl passages 52 into the throat 54 of nozzle 27.

In the operation of the invention with a vortex flow established in chamber 20 and with the particulate material supplied to the chamber, the particles will be centrifuged toward the vanes 18. The clean low molecular weight gas passes through nozzle 27.

The flow of low molecular weight gas through slots 16 will keep the particulate material from reaching vanes 18. Without gas flowing through slots 40 and 50 and swirl passages 52, particles will return toward the vortex core along walls 24 and 28. This would cause particles moving along wall 28 to escape through nozzle 27 which, in a reactor, would burn the nozzle throat. Also, particles remaining in the core will escape through the nozzle.

Gas flowing through swirl passages and slots 40 and 50 will add to the vortex velocity to centrifuge more of the suspended particles out of the core. The flow from slots 40 and 50 will protect wall 28 and resist the tendency for particles to move along the wall 28 toward the exit nozzle 27.

Figure 8:
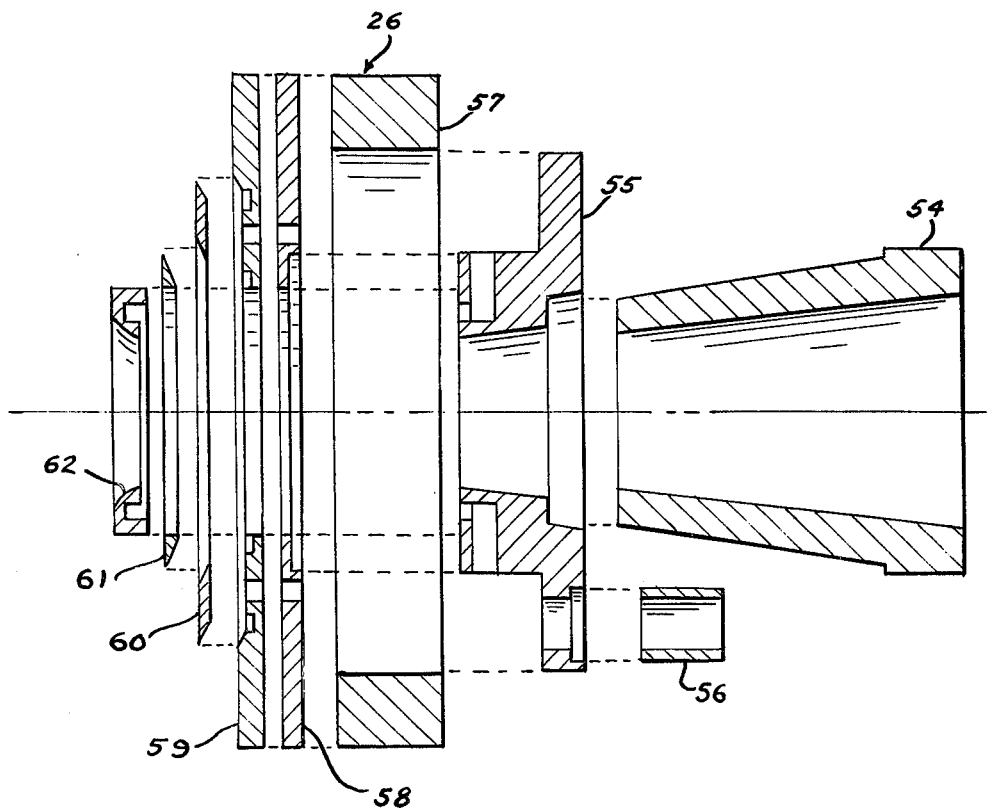
FIG. 8 illustrates one method which may be used in the fabrication of the device of FIGS. 3 and 4.

An assembly 26 used in a reactor could be constructed by machining the separate parts 54, 55, 56, 57, 58, 59, 60, 61 and 62 as shown in FIG. 8 and then welding the parts together. The device could also be constructed by conventional investment casting procedures with slots 40 and 50 being finished with electrochemical machining or with a laser machining process. In constructing the prototype parts, similar to those shown in FIG. 8, were machined separately and assembled with an adhesive.

There is thus provided a wall and nozzle assembly for use with a colloidal core reactor prototype or for a colloidal core reactor.

I claim:

1. In a multi-component flow small length to diameter ratio confined particulate vortex system having a cylindrical chamber with a first wall member and a second wall member spaced from the first wall member; means for providing a flow of low molecular weight gas into said chamber; means, including a plurality of gas flow directing vanes, having slots therebetween, for providing a vortex flow within said chamber; said gas flow directing vanes dividing said chamber into an outer annular plenum chamber and an inner vortex chamber; means for providing a flow of particles into said chamber; a wall and nozzle assembly for said confined vortex system comprising: a vortex chamber exit nozzle; said nozzle having a wall member extending radially therefrom and forming a portion of said first wall member; said exit nozzle being coaxial with the inner vortex chamber; an annular manifold, in said first wall member and surrounding said exit nozzle; means for supplying a low molecular weight gas to said manifold; a plurality of annular slots in the first wall member on the side of said first wall adjacent said inner vortex chamber; means connected between said manifold and said annular slots for directing a flow of gas through the annular slots into the inner vortex chamber radially outward adjacent said first wall; said means for directing the flow through the annular slots including means for providing a circumferential flow to the gas in a direction corresponding to the flow in the inner vortex chamber; means within said wall and nozzle member for supplying a flow of gas to the throat of said nozzle; said means for supplying a flow of gas to the throat of said nozzle including means for providing a circumferential flow to the said gas in a direction corresponding to the direction of flow in the inner vortex chamber.

* * * * *